United States Patent
Faxvog et al.

(10) Patent No.: US 8,537,508 B2
(45) Date of Patent: Sep. 17, 2013

(54) SENSING AND CONTROL ELECTRONICS FOR A POWER GRID PROTECTION SYSTEM

(75) Inventors: Frederick R. Faxvog, Long Lake, MN (US); Wallace Jensen, Centerville, MN (US); Terrance R. Noe, Sebastopol, CA (US); Craig Eid, Santa Rosa, CA (US); David Blake Jackson, Excelsior, MN (US); Greg Fuchs, River Falls, WI (US); Gale Nordling, Excelsior, MN (US)

(73) Assignee: Emprimus, LLC, St. Louis Park, MO (US)

( * ) Notice: Subject to any disclaimer, the term of this patent is extended or adjusted under 35 U.S.C. 154(b) by 2 days.

(21) Appl. No.: 13/185,858

(22) Filed: Jul. 19, 2011

(65) Prior Publication Data

US 2012/0019962 A1    Jan. 26, 2012

Related U.S. Application Data

(60) Provisional application No. 61/366,081, filed on Jul. 20, 2010.

(51) Int. Cl.
*H02H 1/00* (2006.01)

(52) U.S. Cl.
USPC .......................................................... 361/35

(58) Field of Classification Search
USPC .......................................................... 361/35
See application file for complete search history.

(56) References Cited

U.S. PATENT DOCUMENTS

| | | | | |
|---|---|---|---|---|
| 3,619,723 | A * | 11/1971 | Walden ........................... | 361/45 |
| 3,916,261 | A | 10/1975 | Zylstra et al. | |
| 4,153,891 | A * | 5/1979 | McNutt ........................... | 336/70 |
| 4,297,738 | A * | 10/1981 | Lee ............................... | 361/42 |
| 4,654,806 | A | 3/1987 | Poyser et al. | |
| 5,136,453 | A | 8/1992 | Oliver | |
| 5,179,489 | A | 1/1993 | Oliver | |
| 5,390,064 | A | 2/1995 | Russo | |
| 5,684,466 | A * | 11/1997 | Keating et al. ................ | 340/662 |
| 5,751,530 | A | 5/1998 | Pelly et al. | |
| 5,930,099 | A | 7/1999 | Legro et al. | |
| 5,982,276 | A * | 11/1999 | Stewart .......................... | 455/402 |
| 7,529,069 | B1 * | 5/2009 | Weems et al. ................... | 361/42 |
| 2001/0040458 | A1 * | 11/2001 | MacBeth et al. ............... | 324/536 |
| 2007/0217103 | A1 | 9/2007 | AF Klercker Alakula et al. | |
| 2008/0232006 | A1 | 9/2008 | Ramirez et al. | |
| 2010/0097734 | A1 | 4/2010 | Birnbach | |
| 2010/0195256 | A1 | 8/2010 | Birnbach | |
| 2012/0019965 | A1 | 1/2012 | Faxvog et al. | |

OTHER PUBLICATIONS

Invitation to Pay Additional Fees with Partial International Search cited in International Application No. PCT/US2011/044536 mailed Nov. 21, 2011.
International Search Report and Written Opinion for PCT/US2011/044536 mailed Mar. 27, 2012.
International Search Report and Written Opinion for PCT/US2011/044658 mailed Jul. 12, 2012.

* cited by examiner

*Primary Examiner* — Jared Fureman
*Assistant Examiner* — Kevin J Comber
(74) *Attorney, Agent, or Firm* — Merchant & Gould P.C.

(57) ABSTRACT

Systems and method for detecting potentially harmful harmonic and direct current signals at a transformer are disclosed. One such system includes a plurality of detection components electrically connected to electrical signal lines leading from one or more connection points on a power grid, and a plurality of threshold detectors, each threshold detector configured to compare an incoming signal from a detection component to a predetermined signal having a threshold. The system also includes a controller receiving an output from each of the plurality of threshold detectors and configured to drive at least one external component in response to receiving an indication from at least one of the plurality of threshold detectors of a detected signal above a threshold.

26 Claims, 10 Drawing Sheets

SENSING AND CONTROL ELECTRONICS FOR A POWER GRID PROTECTION SYSTEM

CROSS-REFERENCE TO RELATED APPLICATIONS

The present application claims priority to U.S. Provisional Patent Application No. 61/366,081, filed Jul. 20, 2010, and entitled "Geomagnetic Storm Sensor for Protecting Electrical Systems", the disclosure of which is hereby incorporated by reference in its entirety.

TECHNICAL FIELD

The present disclosure relates generally to a high voltage transformer protection system, in particular, the present disclosure relates to a control system that could be used to protect high voltage transformers, power equipment, electronics, and computing systems.

BACKGROUND

Electrical equipment, and in particular electrical equipment operating using alternating current, is subject to varying input signals and conditions. In typical arrangements, alternating current devices in the United States expect to receive a 60 Hz power line source (or 50 Hz in Europe) having a predetermined magnitude (e.g., 120 Volts in North America or 240 Volts in Europe). Although these power sources may vary somewhat, devices made for use with a particular current can typically handle some slight variation in the power signal received.

In some cases, a power signal can vary widely due to external conditions or harmonics. External conditions that may cause harmonics or quasi-direct currents (DC) on a power signal include geomagnetic storms or effects of electrical equipment. Such events can cause the input voltage and current (and resulting power) of a power signal to vary dramatically, causing a potential for damage to the electrical equipment receiving that power signal. Geomagnetic storms or the E3 pulse associated with a high altitude electromagnetic pulse (HEMP) can induce DC or quasi-DC currents called Geomagnetic Induced Currents (GIC) in high voltage power generation, transmission, and distribution system components, i.e. power transmission lines and power transformers. These DC currents can cause half cycle saturation in power transformer cores which in turn can result in excessive reactive power losses, heating, damage and/or failure of such a transformer, particularly in older or poorly maintained transformers. In addition, the half cycle saturation can cause the generation of harmonics of the primary frequency (50 or 60 Hz). This harmonic content can cause power system relays to trigger, which can decouple required compensation components. This in turn can result in the collapse of local or wide area portions of a power grid.

Over approximately the last two decades, several suggested approaches for reducing GIC or HEMP (E3) induced currents in power systems have been proposed. These solutions generally take one of a few forms. A first class of solutions uses a capacitive circuit to simultaneously provide the AC grounding path and a block for the induced DC currents. These solutions generally include a set of switches that allow switching between a normal grounded transformer connection and grounding through the capacitive circuit. These solutions can allow for unintentionally open grounding connections to the transformer neutral, or require expensive electronics for handling ground fault conditions. These capacitive circuit solutions may require readjustment of power system relay settings, as compared to current operational parameters.

A second class of solutions generally includes the continuous use of active components used to reduce potentially damaging GIC events from DC or quasi DC currents in the transformer neutral to ground connection. These solutions typically require expensive power equipment, and are constantly active, such that any failure would render these systems unreliable. Additionally, when this solution is initially installed in the power system many relays/breakers would require readjustments of their settings.

A third class of solutions generally uses a resistive approach in which fixed value resistors are used to continuously reduce the DC current in the neutral to ground connection of a transformer; however in these approaches, the resistor typically must have a high resistance value and would only reduce, not eliminate the DC or quasi DC neutral current. Additionally, during the installation of these classes of solutions a readjustment of the power system's relay settings may be required. As such, there exists no solution that provides a reliable, low cost protection circuit compatible with current power delivery systems. Furthermore, there exists no reliable, testable system for controlling such a protection system that would not require substantial on-site maintenance.

Several suggested approaches for reducing or blocking GIC or E3 induced currents in power systems have been proposed. However, none of these systems provides a comprehensive arrangement for addressing the various types of potentially harmful decisions that may occur. In particular, there has been no known approach that uses a sensing and control system that first senses the presence of GIC or E3 events then switches a DC blocking device to protect high voltage transformers.

For these and other reasons, improvements are desirable.

SUMMARY

In accordance with the following disclosure, the above and other issues may be addressed by the following:

In a first aspect, a sensing and control system for use with an electrical protection circuit is disclosed. The system includes a plurality of detection components configured to detect damaging harmonics and DC or quasi-DC currents on a transformer power line or EMP and IEMI environmental events. These detection components may include, but are not limited to: a harmonic analyzer, a shunt resistor electrically connected between the transformer neutral and ground, a Hall Effect current sensor electrically connected between the transformer neutral and ground, and an electromagnetic field detector positioned external to the shielded enclosure. The system further includes a plurality of threshold detectors configured to compare a signal from a detection component to an adjustable predetermined signal, wherein the threshold detector outputs a signal indication to a controller when the signal from the detection component exceeds the predetermined signal value. The controller, also positioned within the shielded enclosure, is configured to open a normally closed switch in an external protection circuit upon receiving a signal indication from at least one of the plurality of threshold detectors. The controller further includes a control input wherein the control input is received from a power system operator remote from the shielded enclosure. The controller is further configured to execute one or more self-test procedures configured to simulate potentially damaging signals to determine whether the system is functioning properly. In some embodiments, the controller is configured to open the normally closed switch in response to receipt of a signal from the power system operator remote from the shielded enclosure (e.g., a control system). The system optionally includes a shielded enclosure configured to protect electrical components from electromagnetic pulse (EMP) and/or Intentional Electromagnetic Interference (IEMI). In such optional arrangements, filters are positioned along the inner periphery of the shielded enclosure, configured to prevent high frequency, high power electromagnetic signals from entering the shielded enclosure and potentially damaging electrical components.

In a second aspect, a sensing and control system for use with an electrical protection circuit is disclosed. The system includes a shielded enclosure configured to protect electrical components from electromagnetic pulse (EMP) and/or Intentional Electromagnetic Interference (IEMI). Filters are positioned along the inner periphery of the shielded enclosure, configured to prevent high frequency, high power electromagnetic signals from entering the shielded enclosure and potentially damaging electrical components. The system further includes at least one harmonic analyzer positioned within the shielded enclosure, configured to detect damaging harmonics on a transformer power line. The system further includes at least one threshold detector configured to compare a signal from a harmonic analyzer to an adjustable predetermined signal, wherein the threshold detector outputs a signal indication to a controller when the signal from the harmonic analyzer exceeds the predetermined signal value. The controller, also positioned within the shielded enclosure, is configured to open a normally closed switch in an external protection circuit upon receiving a signal indication from at least one of the threshold detectors. The controller further includes a control input wherein the control input is received from a power system operator remote from the shielded enclosure.

In a third aspect, a method for detecting power harmonics in a transformer is disclosed. The method includes receiving a power line signal within a shielded enclosure and generating a total harmonic distortion value based on the power line signal. The method further includes comparing the total harmonic distortion value to a preset threshold value in a threshold detector and generating a switch control output upon detecting a total harmonic distortion value above a predetermined value, wherein the switch control output opens a normally closed switch positioned between a transformer neutral and a ground connection.

In a further aspect, a method for self-testing a sensing and control system is disclosed. The method includes applying an alternating current signal at a transformer, the alternating current signal having a frequency different from that of the power system frequency, and measuring the functionality and magnitude of the blocking characteristic (e.g., impedance) of a direct current blocking (DC) component based on a known amplitude of the alternating current test signal and a current measurement through the direct current blocking component. The method further includes comparing the magnitude of the blocking characteristic of the direct current (DC) blocking component to an expected value to determine accurate operation of the direct current (DC) blocking component. The method further includes applying a harmonic test signal to a power line signal, the harmonic signal having an amplitude above the preset threshold defined by a threshold detector associated with a harmonic analyzer, the threshold defining a range of amplitudes. The method further includes analyzing the harmonic test signal at the harmonic analyzer to determine whether the harmonic analyzer detects the presence of the harmonic test signal. The method also includes applying a direct current (DC) voltage signal at the transformer neutral to simulate direct current flowing between the transformer neutral and a ground; and applying an electromagnetic detector (EM) signal, the EM signal having an amplitude above the preset threshold defined by a threshold detector, the threshold defining a range of amplitudes.

DETAILED DESCRIPTION

In general, the present disclosure describes systems and methods for sensing damaging DC or quasi-DC currents which cause harmonic content on a power line, and controlling a switch assembly in an electrical protection circuit to protect high voltage transformers and other electrical equipment from the damaging DC or quasi-DC currents. Large DC neutral currents and harmonic voltages can be the result of geomagnetic (solar) storms, high altitude electromagnetic E3 pulse (HEMP-E3) or other electrical equipment, such as switching power supplies, arc welding equipment, plasma cutting, electric discharge machining equipment, arc lamps, etc., which are on the same power grid or local power circuit. Overall, the present disclosure describes methods and systems for sensing the harmonic content of a 50 Hz or 60 Hz power line source, and potentially damaging neutral DC currents, and controlling equipment to be switched to a protective mode of operation in case such harmonics or DC currents are detected.

Protection of high voltage power systems from GIC (solar storms) and EMP E3 pulses are achieved using a system that senses damaging DC currents on a power line signal and external high electromagnetic events. The sensing systems disclosed herein provide electronics used to detect the presence of DC currents in the neutral connection of high and extra high voltage power transformers. The sensing system may additionally include a harmonic, or total harmonic, distortion (HD or THD) sensor that senses harmonics on the power line signal which are caused by a DC current and half wave saturation in the transformer windings. The sensing systems may additionally include an electromagnetic field detector that detects external electromagnetic pulse (EMP)

events. The sensing systems may additionally include a detector that computes current through a shunt resistor or a Hall Effect current sensor that is electrically connected to the transformer neutral. The present disclosure further includes a control system that sends signals to an electrical protection circuit to control the operation of a switch assembly in a DC blocking assembly contained in the electrical protection circuit. The control system controls a switch in an electrical protection circuit to protect high voltage transformers from geomagnetic and EMP (E3 pulse) induced currents. A DC blocking component (including one or more capacitors, resistors or combinations thereof) is hard wired in the electrical protection circuit to provide an uninterruptable AC grounding path for the high power systems, for example to the neutral of "Y" configured high transformers or autotransformers. Under normal operation, a second parallel grounding path provides a low impedance, standard grounding path through a closed switch assembly.

Figure 1:
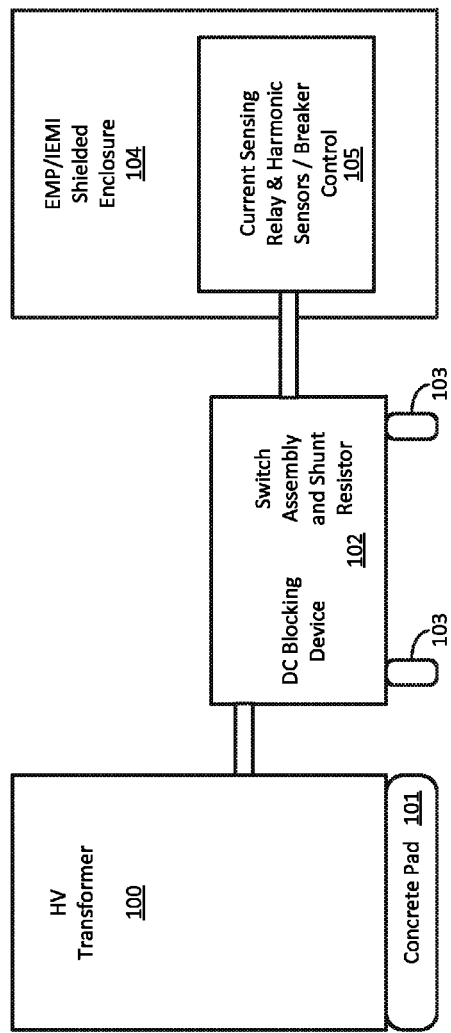
FIG. 1 is a schematic front view of the sensing and control electronics connected to an example embodiment of a high voltage transformer environment.

FIG. 1 is a schematic front view of example electrical equipment protected according to the features of the present disclosure, and a physical layout of certain components of the present disclosure. In the embodiment shown, a piece of electrical equipment, shown as a high-voltage transformer 100, is electrically connected to an electrical protection circuit 102. The electrical protection circuit 102 can, for example, include at least a portion of the devices described below, according to the embodiments shown in FIGS. 2-9. The high voltage transformer 100 is typically mounted on a concrete pad. An electrical protection circuit 102 is electrically connected to the high voltage transformer 100 as discussed above, encased in a housing, and placed on electrically grounded supports 103. In addition to protecting against GIC events, all control electronics (semiconductor devices) are enclosed in an EMP/IEMI shielded and electrically filtered enclosure 104 is electrically connected to the electrical protection circuit 102 and high voltage transformer 100, and includes sensing and switch control circuitry 105. It should be noted that without the shielded and filtered enclosure 104 the system is capable of protect transformers against GIC and EMP E3 events but not against EMP E1, E2, and IEMI pulse threats.

Figure 2:
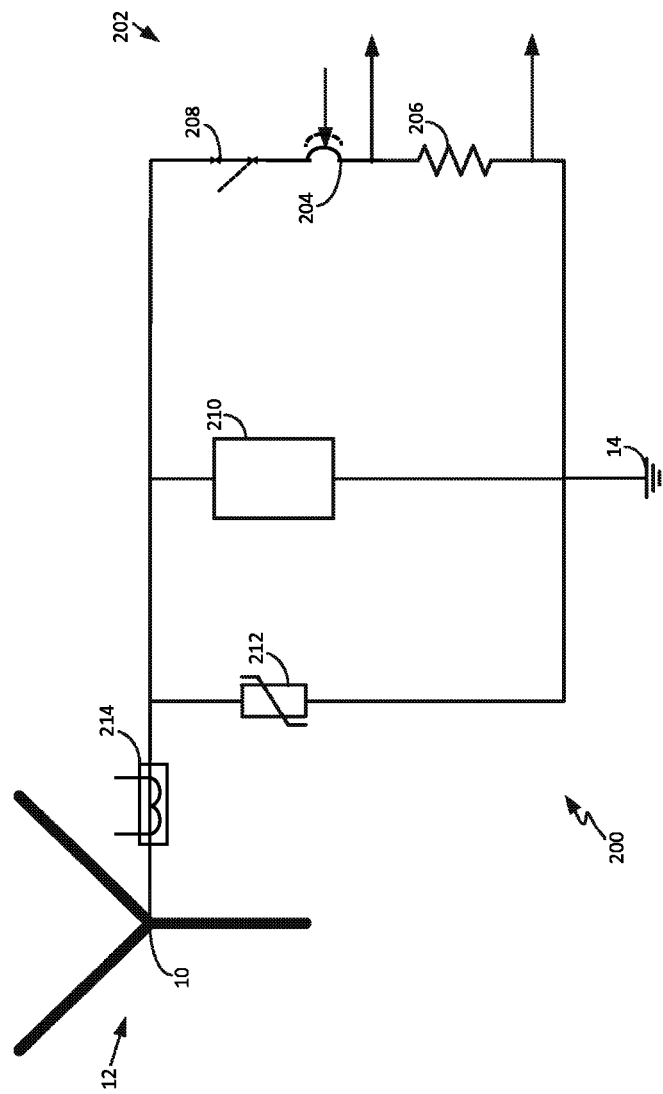
FIG. 2 illustrates an example embodiment of an electrical protection circuit external to the control system of the present disclosure.
Figure 3:
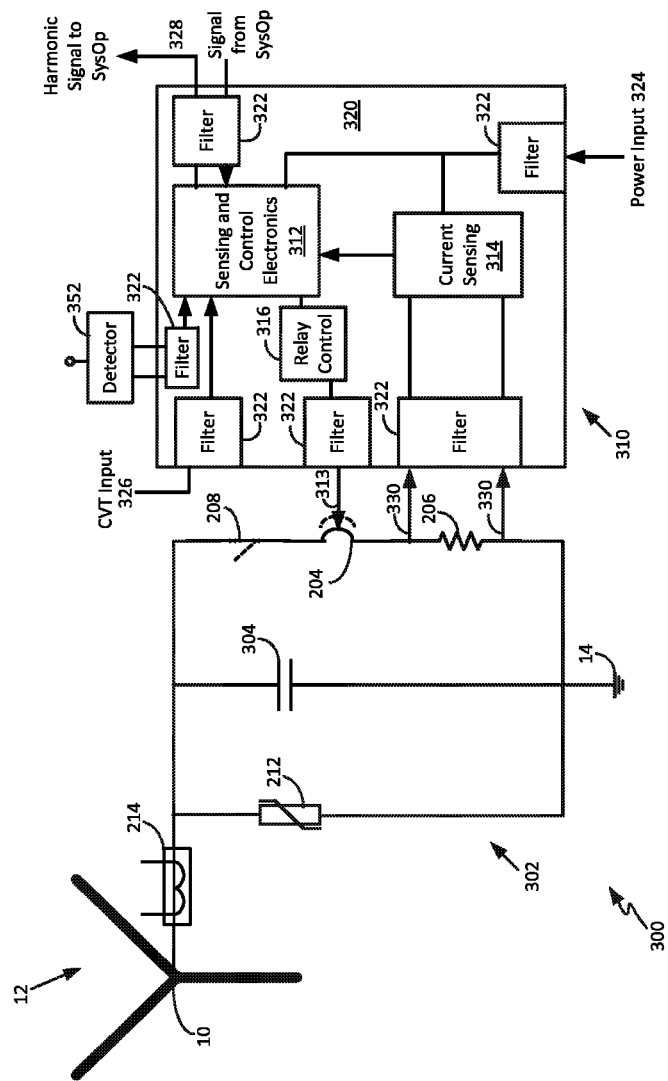
FIG. 3 illustrates an example embodiment of a sensing and control system connected to a continuous grounding system including an example embodiment of an electrical protection circuit.

In certain embodiments, the electrical protection circuit 102 includes the switch assemblies and DC blocking components discussed in FIGS. 2-3, while the control system 104 contains sensing and switch actuation circuitry as illustrated in FIGS. 3-10, below. However, other arrangements of components for an electrical protection device can be provided.

Referring now to FIG. 2, a first generalized embodiment of an electrical protection circuit 200 useable with the sensing and control electronics of the present disclosure is shown. The circuit 200 generally is connected between a transformer neutral 10 of a transformer 12 (shown as Y-transformer in the embodiment shown) and a ground 14. The electrical protection circuit 200 includes a switch assembly 202 including an electrically controlled switch 204 connected between the transformer neutral 10 and ground 14. A shunt resistor 206 can be connected between the switch 204 and ground 14, which can be used to sense DC current passing between the transformer neutral 10 and ground 14. In certain embodiments, the shunt resistor 206 would typically have a low resistance, on the order of a few milliohms, to allow for a low impedance ground connection through the switches. In another embodiment, the shunt resistor 206 could be replaced by a Hall Effect current sensor or other non-contact current sensor. Additionally, an electrically-controlled high voltage grounding switch 208 can be connected between the transformer neutral 10 and the switch 204, for example to protect the switch 204 from high voltages during a ground fault event. In some embodiments, the ground 14 can be connected to a station ground grid, while in other embodiments it can be connected to the transformer housing which is in turn grounded.

The switch 204 can be any of a variety of fast acting electrically-controlled switches, such as a high voltage circuit breaker switch. In the embodiment shown, the switch 204 is a normally-closed connection which can be opened rapidly via an electrical control input. Example sensing and control circuitry that can be connected to the control input is discussed further in connection with FIG. 3-10, below.

A DC blocking component 210 is connected in parallel with the switch assembly 202 between the transformer neutral 10 and the ground 14. As further explained in the examples below, the DC blocking component 210 can include one or more direct current blocking devices (e.g., capacitors or resistors) capable of inserting some blocking of a current path between ground 14 and the transformer neutral 10, to prevent damaging DC or quasi DC ground currents in the transformer neutral 10, which would in turn cause possible damage to the transformer 12. Depending on the specific application, either a capacitive or resistive (or some combination thereof) blocking device 210 could be employed in the protection circuit 302. Furthermore, in certain embodiments, the DC blocking component 210 is hard wired to the ground 14, therefore providing an AC ground for the transformer (or other power component) even if the switches 204 and 208 inadvertently malfunction.

In normal operation, the transformer neutral 10 is grounded through the switch assembly 202. That is, the switch assembly 202, including switch 204 and high voltage grounding switch 208, is normally in a closed position. This corresponds to the standard grounding configuration used by utilities; consequently, a grounding system such as is disclosed herein does not require readjustments to the utility electrical equipment to which it is attached prior to use. In this first mode of operation, the DC blocking component 210 is not energized, because the switching assembly creates a short around it. If a ground fault is detected while operating in this normal operational mode (no GIC), the grounding through the switch assembly will handle the ground fault current until the power system relays isolate the faulted equipment. When the presence of either high power harmonics or a quasi DC current in the neutral to ground connection is detected, the switch assembly is opened by the GIC sensing and control electronics. In this second mode of operation the DC blocking component 210 provides the AC grounding for the transformer neutral. This mode of operation protects against DC or quasi DC currents associated with either GIC or EMP E3 events. This GIC protective mode remains operational until a power system operator at a remote location declares the event to be over and re-closes the switch assembly 202.

In some embodiments, to account for an extremely unlikely event that a GIC and ground fault would occur simultaneously, a surge arrester 212, sometimes known as a varistor or a MOV (metal oxide varistor) or other such surge arresting device, would trigger to protect the blocking components 210. The switch assembly 208 would then be reclosed by a signal from a relay detecting fault current through the transformer neutral current transformer 214 which in turn will trigger the high voltage switch 208 to reclose. Therefore the surge arrester 212 provides the initial grounding within one cycle of the ground fault and until the switch assembly 202 can be reclosed. It is noted that the probability of this simultaneous event (GIC and ground fault) is so small that in practice it may never occur in the lifetime of the system.

To reduce the cost of the surge arrester 212, it may be desirable to use a low cost surge arrester that is a sacrificial device, such that it only protects for one event and will then require replacement. After the surge arrester has been sacrificed, it by its design becomes a short circuit to ground. A second option is to incorporate additional surge arresters in the initial installation with switches such that if the first arrester is sacrificed a second can be switched in as a replacement as needed. A third option is to incorporate a very heavy duty surge arrester in the initial installation that will guarantee that the surge arrester will withstand many ground fault events without failing.

By opening the switch assembly, the DC blocking component 210 shown in FIG. 2 provides the AC grounding path for the transformer neutral 10, while at the same time blocks or reduces the DC or quasi DC induced by a geomagnetic storm or EMP E3 event. Blocking the DC both protects the transformer 12 from entering half cycle saturation which in-turn can cause transformer excessive reactive power losses, overheating, damage or even failure. Additionally, blocking the DC also prevents the generation of harmonics in the power system which in-turn can prevent the tripping of power relays, the disconnection of power compensation components, excessive reactive power burden and potentially the collapse of either small or large portions of the power grid.

Further, to increase the reliability of the DC blocking component 210, either a parallel bank of multiple capacitors or resistors could be used such that if one or more of these capacitors or resistors fail the others would still be available as blocking components.

Additionally, and as further disclosed below, to protect against the E1 and E2 portions of an electromagnetic pulse (EMP) and/or Intentional Electromagnetic Interference (IEMI), all the sensitive sensing and control electronics of such a system can be placed in a shielded and electrically filtered enclosure, such as the enclosure containing control system 104 of FIG. 1. All components which are not housed in the shielded enclosure do not contain sensitive semiconductor electronics and hence would survive either an EMP or IEMI event. In an alternative embodiment where the sensing and control electronics are not placed in a shielded and electrically filtered enclosure, the transformer will still be protected against geomagnetic induced GIC. Additional details regarding the contents of such an enclosure are discussed in further detail below.

In various embodiments, different types of electrical protection circuits could be used. In example embodiments, electrical protection circuits could include those described in copending U.S. patent application Ser. No. 13/159,374, entitled "Continuous Uninterruptable AC Grounding System for Power System Protection", the disclosure of which is hereby incorporated by reference in its entirety.

Referring now to FIG. 3, an example embodiment of a system 300 including an electrical protection circuit 302 electrically connected to the sensing and control system 310 of the present disclosure is shown. In this example embodiment, a Hall Effect current sensor could alternatively be used in place of the shunt resistor 206 of FIG. 2 (and current sensing device 314, described below) for measuring the DC current in the transformer neutral to ground connection. In such embodiments, the Hall Effect sensor would be sacrificed by either an EMP or IEMI attack. There is also a possibility that a Capacitive Voltage Transformer (CVT) (not shown) connected to a phase of the transformer 10, would likewise be sacrificed by an EMP or IEMI attack.

The sensing and control circuit 310 includes control electronics, such as a sensing and control module 312, as well as a current sensing unit 314. A relay control circuit 316 is connected to the sensing and control electronics 312, and generates a switch control output 313 used to actuate the switches 204 and 208.

The sensing and control module 312 senses harmonics which are generated in a half cycle saturated transformer under a GIC event. For example, the module 312 can include a harmonic sensor that will measure the signal from a standard capacitive voltage transformer (CVT) (not shown) which is located on one of the transformer phases. When the signal from either of the neutral DC current or harmonic sensor exceeds a preset value, a signal is sent to open the two switches in the switching assembly 202. The preset values will be selected by the utility or power system engineers according to the protection requirements of each particular installation. The typical ranges for preset values of DC or quasi DC current are expected to be in the range of about 5-50 amps. The typical ranges for preset values of the power harmonic levels are expected to in the range of about 1% to 10% total harmonic distortion (THD). The current sensing circuit 314 measures neutral DC or quasi DC current caused by a geomagnetic storm across shunt resistor 206, and sends the result of that measurement to the sensing and control module 312 to trigger the relay control circuit 316 as necessary.

In the embodiment shown, the control circuit 310 is enclosed within a shielded enclosure 320, and includes a plurality of filters 322 positioned at a periphery of the enclosure 320 to prevent high frequency, high power electromagnetic radiation from entering the enclosure, thereby exposing the sensitive control and sensing electronics to potential interference and damage. The filters 322 can typically be a low pass or band pass filter with surge suppression to suppress any high voltage signals from entering the enclosure. In the embodiment shown, the shielded enclosure 322 is an EMP/IEMI faraday shielded enclosure with conductive gaskets around all door openings to provide radiative protection from electromagnetic frequencies typically from about 14 kHz to 10 GHz. Additionally, in the embodiment shown, a filter 322 is positioned on a power input 324, as well as on a CVT input 326, operator inputs and outputs 328, the switch control output 313, and current sensing inputs 330 connecting across either side of the shunt resistor 206. Additionally, any fiber communications in and out of the enclosure 320 will be filtered via an appropriate waveguide-beyond-cutoff frequency penetration, which will inherently provide protection against EMP and IEMI events.

In operation, when a GIC event is detected by the control circuit 310, the low DC voltage switch, i.e. switch 204, will be opened by the relay control circuit 316, via switch control output 313. Following this action a signal will open the high voltage grounding switch 208. The grounding switch 208 will then typically remain open for the duration of the geomagnetic storm event, typically on the order of a few hours to a day. During this period the DC blocking component 210, in this case capacitor 304, provides the AC ground for the transformer neutral 10 of transformer 12. The reclosing of the grounding switch 208 will typically be controlled by the operator of the power system after the geomagnetic storm has passed. However, some utility installations may prefer to configure their system to reclose the switches automatically, e.g., after a predetermined period of time.

To ensure that the transformer protection would continue its protection function under an EMP or IEMI attack, an Electromagnetic (EM) Field, a detector 352 could be added to this protection system as shown, connecting to the sensing and control electronics 312 via a filter 322. The detector 352 resides outside of the enclosure 320, and would allow the detection of either the EMP E1 or E2 pulse or an IEMI pulse which in turn would be used to open the switch assembly 202, including switches 204, 208 and hence switch in the necessary transformer protection. The EM detector 352 could be mounted on the top or side of the control house and be connected by a shielded conduit to the protected control electronics 310.

In various embodiments, different types of electromagnetic field detectors could be used as detector 352. In example embodiments, electromagnetic field detectors could include those described in copending U.S. patent application Ser. No. 12/906,902, entitled "Electromagnetic Field Detection Systems and Methods", the disclosure of which is hereby incorporated by reference in its entirety.

In operation, even if a Hall Effect sensor and/or the CVT (not shown) were damaged or destroyed by an electromagnetic event, the EM detector 352 would open the switch assembly 202 which in turn would protect the HV transformer 10.

The sensing and control system 310 of the present disclosure is contained within a shielded enclosure 320. The periphery of the shielded enclosure is lined by a plurality of filters 322 that are electrically connected to sensing and control electronics 312. In some embodiments, the sensing and control electronics include a harmonic analyzer 406, a plurality of threshold detectors 408, and a controller 410 as shown and further described in FIG. 4. The sensing and control electronics 312 sense potentially harmful harmonics and/or DC currents in a power line and operate the DC switch 204 and high voltage grounding switch 208 in the electrical protection circuit 302.

Figure 4:
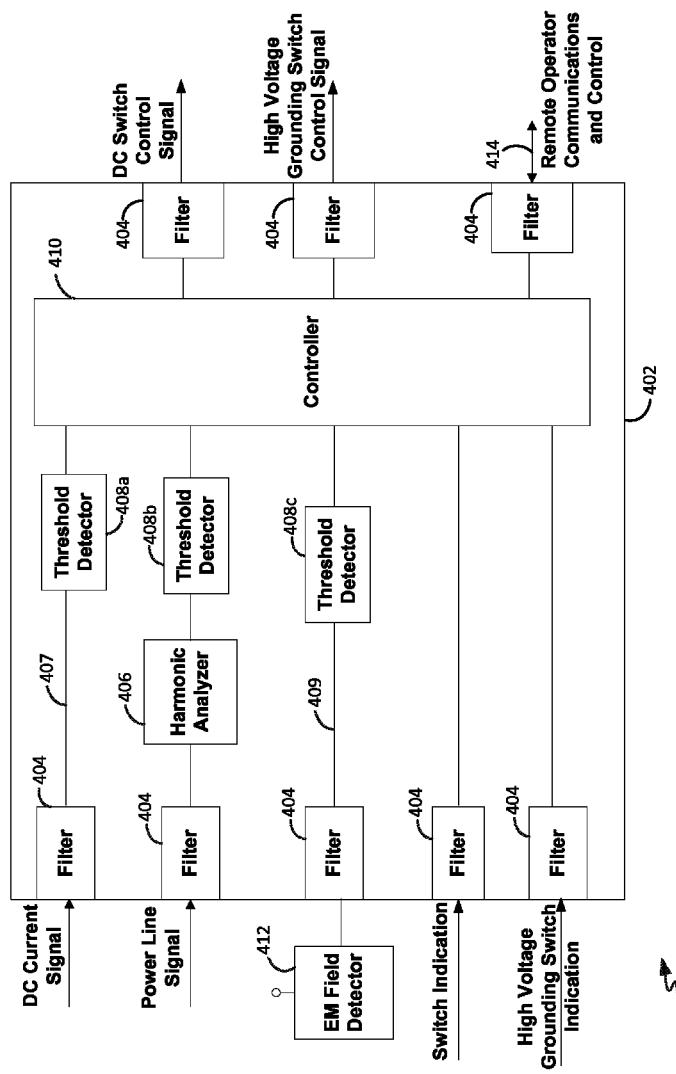
FIG. 4 is an example embodiment of the sensing and control system contained within a shielded enclosure including an external electromagnetic field detector.

Referring now to FIG. 4, a first generalized embodiment of the sensing and control system 400 of the present disclosure is shown. FIG. 4 illustrates a system for detecting a variety of different types of potentially harmful signals to the transformer 12 or other electrical equipment that is the subject of the present disclosure. In particular, the system includes a sensing and control system 400 that detects power harmonics, direct currents (as well as quasi-direct current signals), and EMP/IEMI events according to the present disclosure.

The sensing and control system 400 of the present embodiment includes a shielded enclosure 402 that contains a plurality of filters 404 lined along the periphery of the shielded enclosure 402. The sensing and control system 400 additionally contains an EM field detector 412 (e.g., analogous to detector 352 of FIG. 3) positioned outside the shielded enclosure 402 and is electrically connected to a filter 404. Each filter 404 is electrically connected to a threshold detector 408a-c (collectively referred to as threshold detectors 408), a harmonic analyzer 406, or directly to a controller 410. The output of the harmonic analyzer 406 is electrically connected to a threshold detector 408b. Each threshold detector 408a-c outputs a signal to a controller 410. The controller 410 sends signals remote from the shielded enclosure 402 through a plurality of filters 404.

In operation, the components in the sensing and control system 400 are contained within an EMP/IEMI shielded enclosure 402 that is configured to protect the sensing and control electronics from electromagnetic interference. The periphery of the shielded enclosure 402 is lined with a plurality of low pass or band pass filters 404 to prevent high frequency, high power electromagnetic signals from entering the enclosure that would expose the sensitive control and sensing electronics to potential interference and damage. The filters 402 are generally analogous to filters 322 of FIG. 3, described above.

In certain embodiments, the present disclosure includes a harmonic analyzer 406 located within the shielded enclosure 402 as discussed in more detail below. The harmonic analyzer 406 is another example of a detection component used to detect the total harmonic distortion (THD) on an incoming power line signal from the transformer 12. The harmonic analyzer 406 is electrically connected to the controller 410, described in further detail below.

In the embodiment shown, the plurality of threshold detectors 408a-c are each configured to compare an incoming signal indication from a detection component, such as an external electromagnetic (EM) field detector 412, to an adjustable predetermined threshold value. If the predetermined threshold value is exceeded, the corresponding threshold detector 408 will send a signal to a controller 410 also positioned within the shielded enclosure 402. The controller 410 is configured to drive at least one of the external components of the electrical protection circuit 200 such as a switch 204, as shown in FIG. 3. For example, if the DC or quasi-DC current through a shunt resistor 206 positioned between transformer neutral and ground exceeds the predetermined threshold value of the threshold detector 408, the threshold detector 408 will send an indication to the controller 410. The controller 410 will in turn send a signal through a filter 404 to open the normally closed switch 204 that is located between transformer neutral and ground in order to protect the high voltage transformer 12 from damage.

In the embodiment shown, each of the threshold detectors 408a-c can be configured to detect a different type of signal, or a signal received having a different triggering threshold. For example, threshold detector 408a, which is configured to detect a predetermined direct current above a predetermined threshold, can be configured to trigger controller 410 when above a first threshold, but detector 408b, which receives signals from harmonic analyzer 406, can be configured to trigger controller 410 upon detection of a different type of signal, or at a different signal threshold level. The same is true of threshold detector 408c, which receives signals from the EM field detector 412. In alternative embodiments, additional types of potentially harmful signals can be monitored and fed to a threshold detector for triggering controller 410.

The controller 410 can be any of a number of types of programmable circuits, and configured to generate a switching output signal in response to receipt of a signal from one or more of the threshold detectors 408a-c. In some embodiments, the controller 410 is a microprocessor configured for managing switching outputs based on programmable logic based on detection of a signal from either a threshold detector or a control input 414. In the embodiment shown, the control input 414 is electrically connected to the controller 410, and leads to a system controller remote from the shielded enclosure 402. The control input 414 may exchange data between the system controller and the controller 410, for example to communicate a history of switching events triggered by the sensing and control electronics, as well as to provide remote triggering and reset functionality. The control input 414 can also trigger execution of one or more self-test procedures configured to simulate potentially damaging signals for monitoring purposes. The controller 410 can, for example, test switch actuation based on switch indication and high voltage grounding switch indication inputs, as depicted. These self-test procedures are described more fully below.

Figure 5:
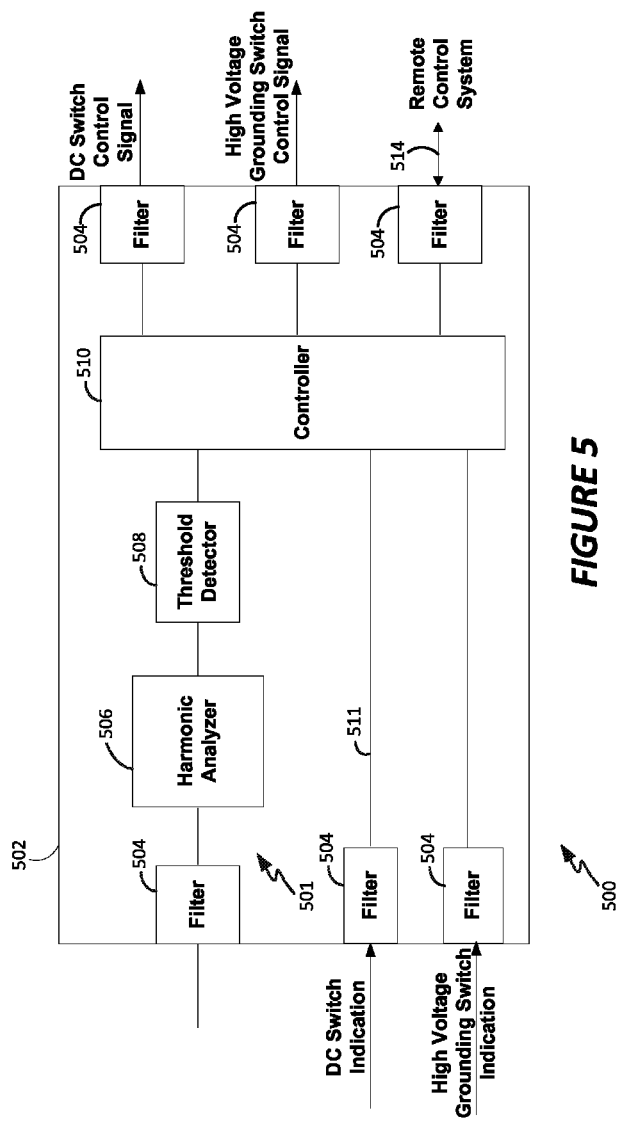
FIG. 5 is an example embodiment of the sensing and control system contained within a shielded enclosure.

FIG. 5 illustrates an example embodiment of the present disclosure for detecting power harmonics in a transformer. The electronics 500 can be used, for example as a portion of the sensing and control electronics 400 of FIG. 4, or alternatively as a stand-alone element in situations where harmonic signals are of primary concern (rather than in combination with sensing of DC signals. This example embodiment includes a series of sensing and control components contained in a shielded enclosure 502 that is lined with a plurality of filters 504. These filters are analogous to the filters described in FIG. 4. The sensing components 501 include a filter 504, a harmonic analyzer 506, and a threshold detector 508. A filter 504, to reject conducted high energy electromagnetic pulses and intentional electromagnetic interference (IEMI), is electrically connected to a signal line extending into the shielded enclosure 502. The filter 504 is electrically connected to a harmonic analyzer 506 that outputs a signal to a threshold detector 508. The threshold detector 508 is electrically connected to a controller 510 also contained within the shielded enclosure 502.

In another example embodiment example, only a DC signal would be sensed in a transformer neutral to ground connection, for example in a situation where DC currents are of primary concern.

The present disclosure also includes a communications bus 514 that is electrically connected to the controller 510. The communications bus 514 leads to a system operator remote from the shielded enclosure 502. The communications bus 514 may also execute one or more self-test procedures configured to simulate potentially damaging signals for monitoring purposes. These self-test procedures are described more fully below.

In operation, the harmonic analyzer 506 receives a voltage signal from a CVT (not shown in the figures) located on one of the phases of the power transformer 12 through a filter 504. The harmonic analyzer 506 detects power harmonics in a transformer 12. The harmonics detected by the harmonic analyzer 506 are compared to an adjustable predetermined threshold value of a threshold detector 508. If the harmonics exceed the predetermined threshold value of the threshold detector 508, the threshold detector sends a signal indicating the threshold value has been exceeded to the controller 510 located within the shielded enclosure 502. In some embodiments the harmonic analyzer, threshold detector and controller are all implemented within a microprocessor. The controller 510 sends a switch indication signal through a filter 504 to open a DC switch, such as switch 204 of FIGS. 2-3, followed by a signal to open a high voltage grounding switch 208 to protect the transformer 12 and/or to provide electric power grid stability from potentially harmful DC currents in the transformer neutral and to reduce harmonics on the power line signal.

Figure 6:
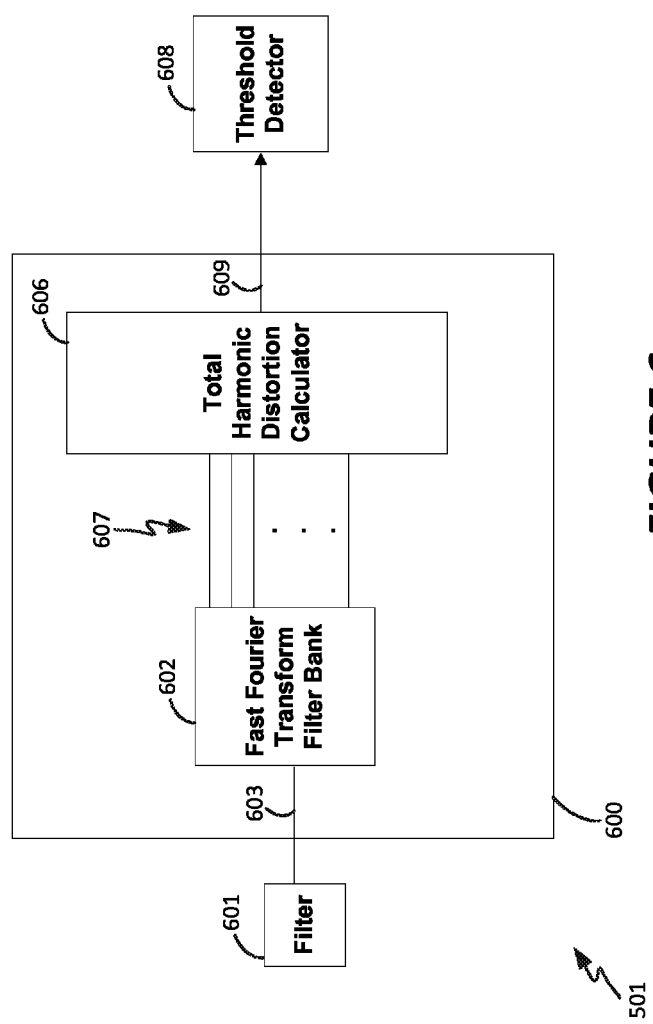
FIG. 6 is an example embodiment of the harmonic analyzer contained within the sensing and control system.
Figure 7:
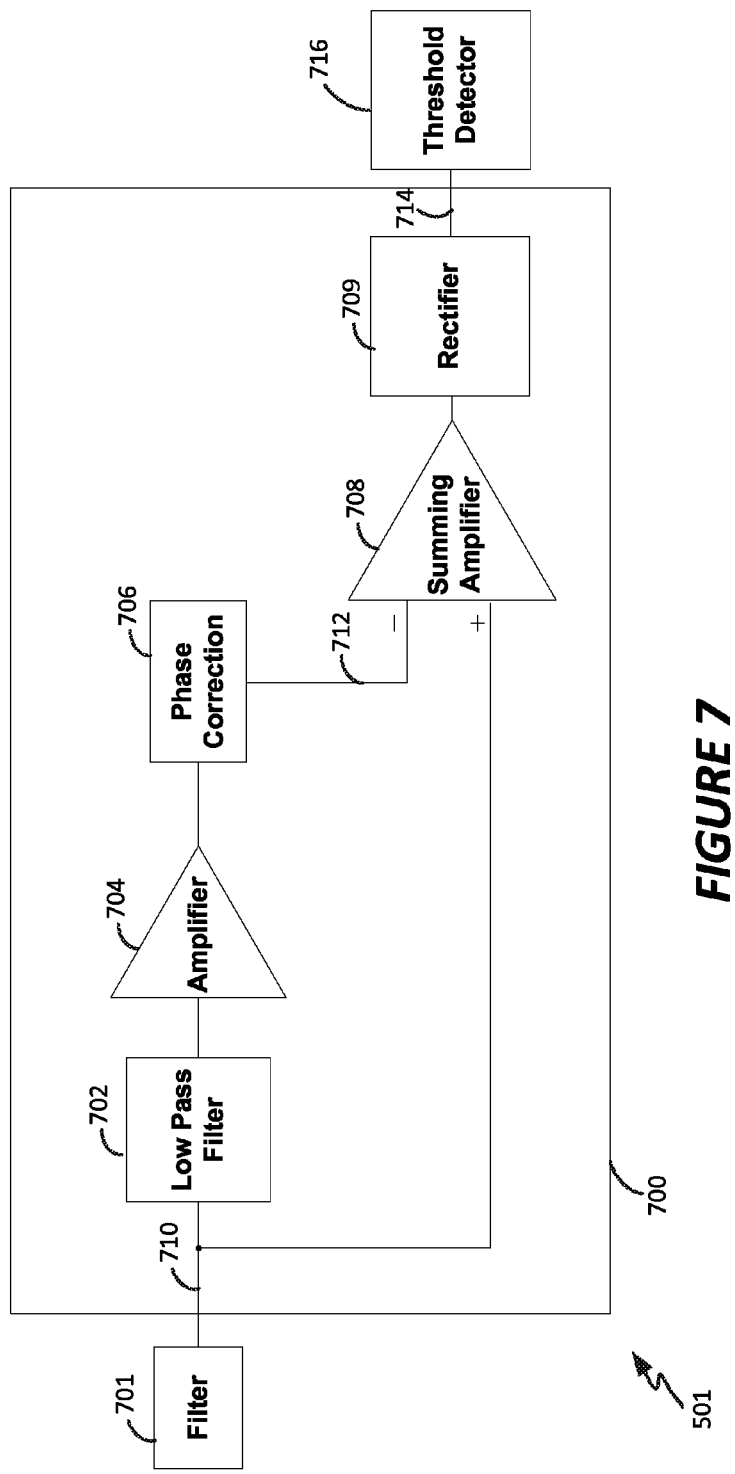
FIG. 7 is another example embodiment of the harmonic analyzer contained within the sensing and control system.
Figure 8:
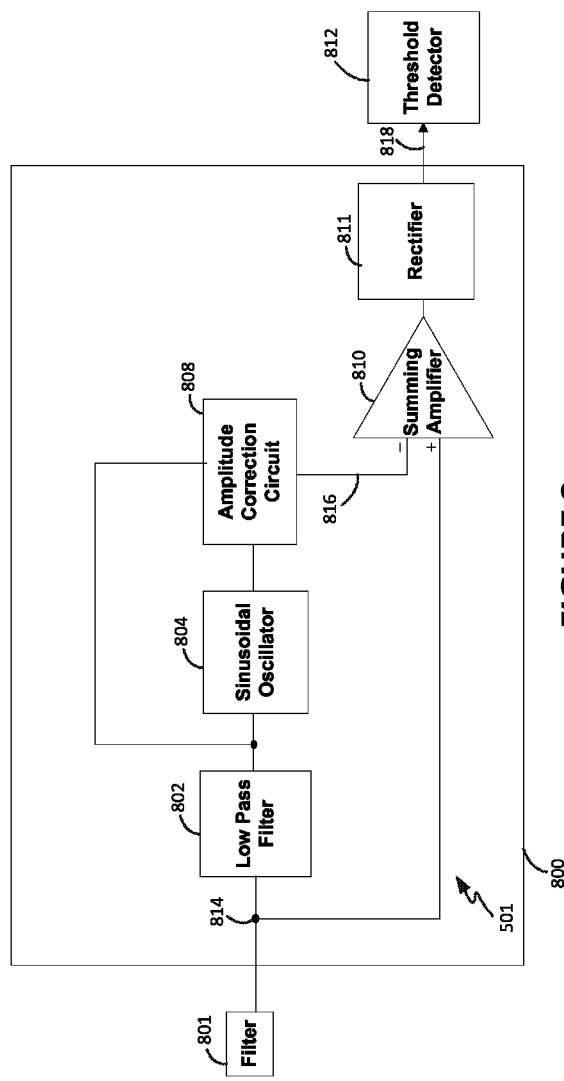
FIG. 8 is another example embodiment of the harmonic analyzer contained within the sensing and control system.

Referring now to FIGS. 6-8, various embodiments of sensing and control electronics including a harmonic analyzer useable in the systems of FIGS. 3-5 (e.g., as harmonic analyzer 406). FIG. 6 illustrates a first possible embodiment of a harmonic analyzer 600, useable as harmonic analyzer 406 as shown in FIG. 4 or harmonic analyzer 506 as shown in FIG. 5 for detecting power harmonics in a transformer 12. This embodiment uses a microprocessor 600 to compute a Fast Fourier Transform (FFT) to detect power harmonics in the power signal 603. This embodiment includes a microprocessor 800 that contains an FFT calculator 602, and a total harmonic distortion calculator 606. The FFT calculator 602 in the microprocessor 600 transforms the power line signal 603 into a plurality of frequency signals, acting as a bank of bandpass filters. The sample rate of the system and number of points in the FFT are set so that each of the harmonics of the harmonics of the input signal falls into a different filter bin, corresponding to a unique output index in the FFT. These signals 605 are separated into frequency bands 607 corresponding to a range of harmonics of the 60 Hz (or 50 Hz) power frequency using bandpass filters within the Fast Fourier Transform Filter Band 602. These harmonics are then used to calculate the total harmonic distortion (THD) 609 using a total harmonic distortion calculator 606 in the microprocessor 600.

This total harmonic distortion signal 609 is then compared to a preset threshold level in the microprocessor (e.g., illustrated as threshold detector 608) and if THD signal exceeds the present level a signal is sent to open the switch assembly, including switches 204 and 208.

FIG. 7 illustrates a further possible embodiment of a harmonic analyzer 700. The harmonic analyzer 700 can be used in place of harmonic analyzer 406 as shown in FIG. 4 or harmonic analyzer 506 as shown in FIG. 5, for detecting power harmonics in a transformer 12. The harmonic analyzer 700 is electrically connected between a filter 701 and a threshold detector 716. Collectively, these components comprise sensing components 501. This example embodiment of a harmonic analyzer 700 includes a low pass filter 702 electrically connected to an amplifier 704 and a phase correction module 706. The output of the phase correction module 706 is electrically connected to a summing amplifier 708. The output of the summing amplifier 708 is connected to a rectifier circuit 709, which adjusts the amplitude of the signal, resulting in a signal 714 proportional to total harmonic distortion.

In operation, this example embodiment of a harmonic analyzer 700 subtracts an unfiltered power line signal 710 from a filtered and phase shifted signal 712, which is then amplitude adjusted to output the total harmonic distortion signal 714. This example embodiment includes a low pass filter 702 configured to filter the noise of an unfiltered power line signal 710. From the low pass filter, the filtered power line signal passes through an amplifier 704 for amplitude adjustment. The signal then passes through a phase correction module 706 configured to synchronize the phase of the amplitude adjusted and filtered signal. The filtered, amplitude adjusted and phase shifted signal 712 is then compared to the unfiltered power line signal 710 at a summing amplifier 708. The summing amplifier 608 subtracts the two signals to output the power line harmonics 714 of the power line signal. The power line harmonics signal is then rectified at the rectifier circuit 709 to produce a voltage proportional to the THD on the power line. The total harmonic distortion signal 714 is then sent to a threshold detector 716, for comparison to the total harmonic distortion as explained above in connection with FIG. 5.

FIG. 8 illustrates another possible embodiment of a harmonic analyzer 800, useable as harmonic analyzer 406 as shown in FIG. 4 or harmonic analyzer 506 as shown in FIG. 5 for detecting power harmonics in a transformer 12. The harmonic analyzer 800 includes a power line signal electrically connected to a low-pass filter 801 and a threshold detector 812. This example embodiment of a harmonic analyzer 800 includes a low pass filter 802 electrically connected to a phase-locked sinusoidal oscillator 804. The oscillator 804 is used to produce a clean signal lacking harmonic content, that replicates the 60 Hz (or alternatively 50 Hz) power line signal. An amplitude adjustment circuit 808 adjusts the output of the oscillator 804 to match the expected power line signal frequency. The output of the amplitude adjusted, phase-locked sinusoidal oscillator 804 (from the amplitude correction circuit 808) is electrically connected to a summing amplifier 810. Finally, the output of the summing amplifier 810 is connected to a rectifier 811 to produce a signal 818 which is proportional to the total harmonic distortion (THD) on the power line. Collectively, these components comprise sensing components 801.

This example embodiment is similar to the harmonic analyzer 706 of FIG. 7, but uses a phase-locked sinusoidal oscillator 808 to generate a clean 120V, 60 Hz (or clean 240 V, 50 Hz) reference signal that is subtracted from the unfiltered power line signal 814. This alternative embodiment includes a low pass filter 802 configured to filter out the noise and harmonics of an unfiltered power line signal 814. The filtered signal is then used as a reference signal input to a phase-locked sinusoidal oscillator 804. The phase-locked sinusoidal oscillator 804 generates a clean 120V, 60 Hz signal 816 that is compared to the unfiltered power line signal 814 at a summing amplifier 810. The summing amplifier 810 and rectifier 811 output the signal 818 that is proportional to total harmonic distortion on the power line signal 814, and that is sent to a threshold detector 812.

Figure 9:
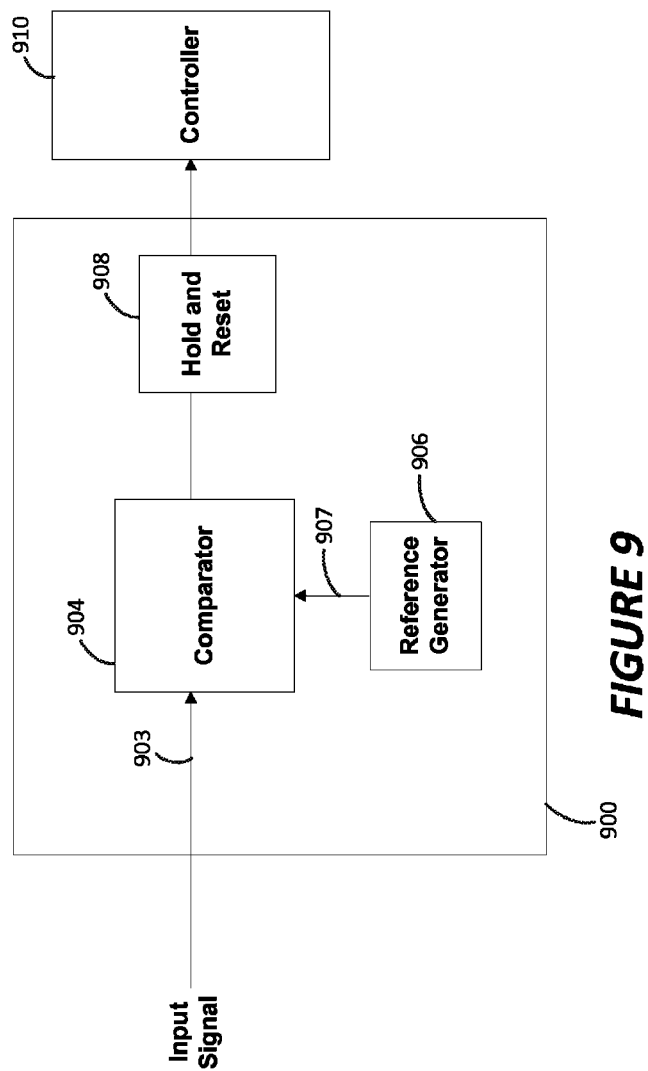
FIG. 9 illustrates an example embodiment of a threshold detector circuit contained within the sensing and control system.

FIG. 9 illustrates a possible embodiment of a threshold detector 900, useable as the threshold detector 408 as shown in FIG. 4 or threshold detector 508 as shown in FIG. 5 for comparing power harmonics and DC currents in a transformer 12. This example embodiment of a threshold detector receives harmonics or quasi-DC currents from a rectifier (e.g., rectifier 709 of FIG. 7 or 811 of FIG. 8) that is electrically connected to a comparator 904. The comparator 904 is electrically connected to a reference generator 906 and a hold and reset circuit 908. The hold and reset circuit 908 outputs a signal to an electrically connected controller 910 that is located external to the threshold detector 900.

In operation, the threshold detector receives harmonics or quasi-DC currents from an incoming power line signal or a harmonic analyzer 406. The comparator 904 compares the rectified signal 903 to a reference signal 907. The comparator 904 receives the reference signal 907 from an adjustable reference generator 906 that defines a harmonic distortion acceptable to the transformer 12. Upon a comparison between the reference signal 907 and the input signal 903, the comparator 904 generates a signal that can be captured at a hold and reset circuit 908. The captured signal is then sent to a controller 910 that can be used to trigger a switch 204 as shown in FIGS. 2-3.

Figure 10:
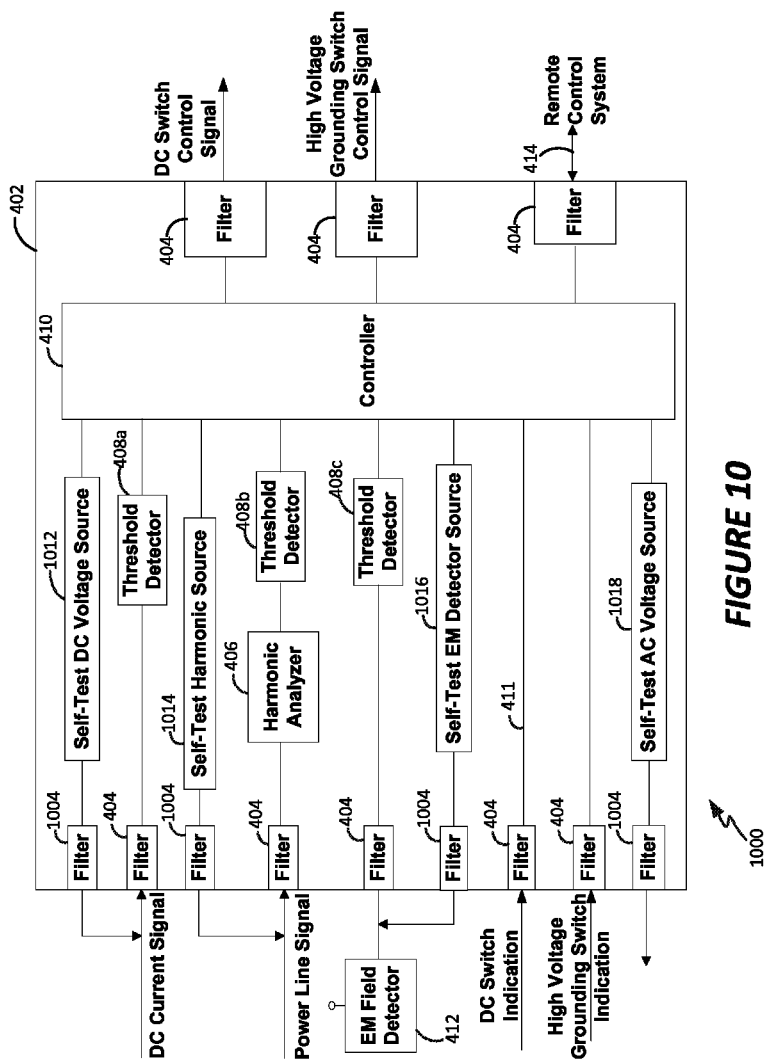
FIG. 10 illustrates an example embodiment of the sensing and control electronics including self-test functionality.

FIG. 10 represents an example embodiment of the present disclosure of FIG. 4, but additionally includes self-test features to ensure proper system operation. This embodiment of the present disclosure includes a self-test DC voltage source 1012, a self-test harmonic source 1014, a self-test EM detector source 1016, and a self-test AC voltage source 1018 located within the shielded enclosure 402. In some embodiments, these self-test features are triggered automatically on a periodic basis by the controller 410. These self-test features can also be triggered by a user operating a control system located at a remote site from the shielded enclosure 402.

A self-test AC voltage source 1018 generates an AC signal with a frequency different from that received at the transformer 12. The AC voltage exits the shielded enclosure 402 through a filter 1004 and is applied to the transformer neutral 10. The electrical protection circuit 200 as shown in FIG. 2, in its normal operation mode, measures the magnitude of the current across a DC blocking device 210 based on a known amplitude of the AC signal generated by the AC voltage source 1018. The controller 410 compares the magnitude of the DC blocking device 210 with an expected value to determine whether the DC blocking component 210 is operating accurately.

Another self-test function within the present disclosure is a self-test DC voltage source 1012 that generates a direct current intended to simulate a direct current in the transformer neutral 10 to ground 14 connection. The generated direct current is outside the range of normal operation of the direct current in the transformer neutral 10 to ground 14 connection. The direct current generated by the self-test DC voltage source 1012 exits the shielded enclosure 402 through a filter 1004 and re-enters the shielded enclosure 402 through the direct current signal input. The generated signal is then passed through a threshold detector 408 for comparison to a known value that is acceptable to the transformer 10. If sensing and control system 1000 is operating properly, the controller 410 will trigger an indication signal that will exit the shielded enclosure 402 through a filter 404 to open a switch 204 in the electrical protection circuit 200. If the controller 410 does not open the switch 204, the controller 410 will send an error message to a remote control system external to the shielded enclosure 402.

Another self-test function within the present disclosure is a self-test harmonic source 1014 that generates a harmonic signal intended to simulate undesired harmonics on a power line signal. The generated harmonic signal exits the shielded enclosure 402 through a filter 1005 and re-enters the shielded enclosure 402 through the power line signal input. The signal is passed through a harmonic analyzer 406 that compares the generated harmonic signal to a known, acceptable frequency. If the sensing and control system 1000 is operating properly, the controller 410 will trigger an indication signal that will exit the shielded enclosure 402 through a filter 404 to open a switch 204 in the electrical protection circuit 200 as shown in FIG. 2. If the controller 410 does not open the switch 204, the controller 410 will send an error message to a remote control system external to the shielded enclosure 402.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A system for detecting potentially damaging electromagnetic signals including high direct currents in a transformer neutral and harmonics of a primary power frequency, the system comprising:
   a plurality of detection components electrically connected to one or more electrical signal lines leading from one or more connection points on a power grid;
   a plurality of threshold detectors, each threshold detector configured to compare an incoming signal from a detection component selected from among the plurality of detection components to a predetermined signal having a threshold;
   a controller receiving an output from each of the plurality of threshold detectors, the controller configured to drive at least one external component in response to receiving an indication from at least one of the plurality of threshold detectors of a detected harmonic or direct current signal above a threshold; and
   a shielded enclosure having an interior volume housing at least the plurality of the threshold detectors and the controller, the shielded enclosure configured to shield the interior volume from electromagnetic interference.

2. The system of claim 1, wherein the plurality of detection components are selected from a group of detectors consisting of:
   a harmonic analyzer;
   a shunt resistor electrically connected between the transformer neutral and a ground;
   a Hall effect current sensor connected across a grounding line, the grounding line connected between the transformer neutral and a ground; and
   an electromagnetic field detector.

3. The system of claim 2, further comprising:
a plurality of filters positioned along a periphery of the shielded enclosure and connected to the electrical signal lines, the electrical signal lines extending into the interior volume from external to the shielded enclosure, the filters configured to prevent high frequency, high power electromagnetic signals from entering the shielded enclosure.

4. The system of claim 3, wherein the harmonic analyzer is positioned within the shielded enclosure.

5. The system of claim 4, wherein the shunt resistor is positioned external to the shielded enclosure.

6. The system of claim 5, wherein the Hall Effect current sensor is positioned external to the shielded enclosure.

7. The system of claim 6, wherein the electromagnetic field detector is positioned external to the shielded enclosure.

8. The system of claim 1, wherein the controller is configured to open a normally-closed switch connected between the transformer neutral and a ground connection.

9. The system of claim 1, wherein the controller is configured to open the normally-closed switch upon receipt of a signal from any of the plurality of threshold detectors indicating that a harmonic or direct current signal above a threshold has been detected on the transformer neutral.

10. The system of claim 1, wherein the indication received from at least one of the plurality of threshold detectors represents a detected harmonic, a direct current signal, or an electromagnetic pulse above a threshold associated with that threshold detector.

11. The system of claim 10, wherein each threshold detector has a different associated threshold.

12. The system of claim 11, wherein each different associated threshold is adjustable.

13. The system of claim 1, further comprising a control input electrically connected to the controller, the control input received from a system operator positioned remote from the shielded enclosure.

14. The system of claim 1, wherein the controller is configured to execute one or more self-test procedures, the self-test procedures configured to confirm that the system operates as expected in the event of damaging of degrading events.

15. The system of claim 14, wherein the one or more self-test procedures are selected from a group of procedures consisting of:
applying an alternating current signal at the transformer, the alternating current signal having a frequency different from that-of the power system frequency;
applying a harmonic signal at a harmonic analyzer, the harmonic signal having an amplitude above the preset threshold defined by a threshold detector associated with the harmonic analyzer, the threshold defining a range of amplitudes;
applying a direct current (DC) voltage signal at the transformer neutral to simulate direct current received at the transformer neutral and
applying an electromagnetic (EM) detector signal, the EM signal having an amplitude above the preset threshold defined by a threshold detector, the threshold defining a range of amplitudes.

16. A system for detecting harmonics in a transformer signal or on a power line, the system comprising:
a shielded enclosure having an interior volume, the shielded enclosure configured to shield the interior volume from electromagnetic interference;
a plurality of filters positioned along a periphery of the shielded enclosure and connected to electrical signal lines extending into the interior volume from external to the shielded enclosure, the filters configured to prevent high frequency, high power electromagnetic signals from entering the shielded enclosure, and wherein at least one of the electrical signal lines is connected to a power line signal;
a harmonic analyzer positioned within the interior volume and electrically connected to the power line signal, the harmonic analyzer configured to output a total harmonic distortion on the power line signal;
a threshold detector configured to compare the total harmonic distortion to a preset threshold signal, wherein the threshold detector is configured to output a switching signal if the preset threshold signal is exceeded; and
a controller positioned within the interior volume and configured to receive the switching signal, the controller configured to drive one or more of a plurality of external switching components in response to the switching signal.

17. The system of claim 16, wherein the harmonic analyzer further compromises:
a programmable circuit configured to perform a fast Fourier transform on the power line signal to act as a band-pass filter bank so that the output coefficients of the Fourier transform correspond to the power line frequency and its harmonics;
a total harmonic distortion calculator within the programmable circuit configured to calculate a total harmonic distortion based on magnitudes of the frequency signals in the plurality of frequency bands.

18. The system of claim 17, wherein total harmonic distortion calculator is configured to divide magnitudes of the frequency signals in each frequency band other than the first frequency band by a magnitude of signals in the first frequency band.

19. The system of claim 16, wherein the harmonic analyzer further comprises:
a low pass filter configured to filter noise from the power line signal;
an amplifier configured to adjust amplitude of the filtered power line signal;
a phase shifting component configured to synchronize the phase of the filtered power line signal wherein the phase shifting component outputs a filtered signal;
a summing amplifier configured to subtract the filtered signal from the power line signal and output a signal representing harmonic content of the power line; and
a rectifier configured to generate a signal representing a total harmonic distortion on the power line signal.

20. The system of claim 16, wherein the harmonic analyzer further comprises:
a low pass filter configured to filter noise from the power line signal;
a zero crossing detector configured to adjust a frequency of the power signal;
an amplifier configured to adjust amplitude of the power line signal;
a phase-locked sinusoidal oscillator configured to generate a reference signal;
a summing amplifier configured to subtract the filtered signal from the power line signal and output a signal representing harmonic content of the power line; and
a rectifier configured to generate a signal representing a total harmonic distortion on the power line signal.

21. The system of claim 16, wherein the threshold detector further comprises:

a rectifier configured to rectify a harmonic distortion signal;

a reference generator configured to supply a reference signal;

a comparator circuit configured to compare the reference signal to the harmonic distortion signal; and a hold and reset circuit designed to receive an output signal from the comparator circuit and generate a control signal directing switching of the external switching components.

22. The system of claim 21, wherein the reference signal is adjustable to define a range of harmonic distortion acceptable at the transformer.

23. The system of claim 21, wherein the threshold detector is at least partially embodied in a microprocessor.

24. The method of claim 23, wherein generating a total harmonic distortion value based on the power line signal comprises:

performing a Fourier transform on the power line signal to generate a plurality of frequency signals;

filtering the plurality of frequency signals using a plurality of band pass filters to generate a plurality of frequency bands; and calculating a total harmonic distortion based on magnitudes of signals in each of the plurality of frequency bands.

25. A method of self-testing operable within a system for detecting damaging or degrading events or signals at a transformer neutral, the method comprising:

applying an alternating current signal at a transformer, the alternating current signal having a frequency different from that of the power system frequency;

measuring a functionality and magnitude of a blocking characteristic of a direct current blocking (DC) component based on a known amplitude of the alternating current signal and a current measurement through the direct current blocking component;

comparing the magnitude of the blocking characteristic of the direct current (DC) blocking component to an expected value to determine accurate operation of the direct current (DC) blocking component;

applying a harmonic signal to a power line signal, the harmonic signal having an amplitude above the preset threshold defined by a threshold detector associated with a harmonic analyzer, the threshold defining a range of amplitudes;

analyzing the harmonic signal at the harmonic analyzer to determine whether the harmonic analyzer detects the presence of the harmonic signal;

applying a direct current (DC) voltage signal at the transformer neutral to simulate direct current flowing between the transformer neutral and a ground; and applying an electromagnetic detector (EM) signal, the EM signal having an amplitude above the preset threshold defined by a threshold detector, the threshold defining a range of amplitudes.

26. The method of claim 25, further comprising generating at a controller a control signal in response to detection of one or more of the alternating current signal, the harmonic signal, the direct current signal, and the electromagnetic detector signal.

* * * * *